(12) United States Patent
Hung et al.

(10) Patent No.: US 6,540,199 B2
(45) Date of Patent: Apr. 1, 2003

(54) COVERING STRUCTURE

(75) Inventors: Chien Ju Hung, Taoyuan (TW); Win-Long Chung, Taipei Hsien (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 09/955,536

(22) Filed: Sep. 17, 2001

(65) Prior Publication Data

US 2002/0047081 A1 Apr. 25, 2002

(30) Foreign Application Priority Data

Oct. 20, 2000 (TW) ..................................... 89218180 U

(51) Int. Cl.[7] ............................................... A47G 29/08
(52) U.S. Cl. ................. 248/694; 248/291.1; 248/309.1; 248/918; 220/756
(58) Field of Search .......................... 248/309.1, 291.1, 248/292.11, 292.12, 694, 918; 220/756, 759, 480; 403/321, 322.1, 325, 83, 84, 91, 92, 101; 16/443, 444, 900; 294/15

(56) References Cited

U.S. PATENT DOCUMENTS

| | | | | |
|---|---|---|---|---|
| 4,815,683 A | * | 3/1989 | Ferrante | 248/205.2 |
| 5,261,554 A | * | 11/1993 | Forbes | 220/592.16 |
| 5,409,107 A | * | 4/1995 | Browne | 206/305 |
| D389,000 S | * | 1/1998 | Etingin | 206/308.3 |
| D398,471 S | * | 9/1998 | Malik | D6/570 |
| 5,906,348 A | * | 5/1999 | Orenstein | 248/311.2 |
| D418,119 S | * | 12/1999 | Rowell | D3/218 |
| 5,996,786 A | * | 12/1999 | McGrath | 206/308.1 |
| D433,063 S | * | 10/2000 | Fong | D19/77 |
| 6,161,738 A | * | 12/2000 | Norris | 109/49.5 |
| 6,196,431 B1 | * | 3/2001 | Underhill | 224/237 |
| 6,398,023 B1 | * | 6/2002 | Williams | 206/308.1 |
| 6,398,178 B1 | * | 6/2002 | Azola et al. | 248/442.2 |

* cited by examiner

Primary Examiner—Leslie A. Braun
Assistant Examiner—Deborah M. Brann
(74) Attorney, Agent, or Firm—Ladas & Parry

(57) ABSTRACT

A covering structure, comprising a case and supporting element pivotally connected to the case. The supporting element may be oriented between two positions. The supporting element also incorporates a supporting socket, provided as a carrying holder when oriented in the first position. Additionally, the supporting socket integrates the ability to contain objects when oriented in the second position.

11 Claims, 9 Drawing Sheets

COVERING STRUCTURE

BACKGROUND OF THE INVENTION

1. Field of the Invention

The present invention relates to a covering structure, particularly relates to a covering that comprises additional attachments. The attachments are provided to constitute a dual-functional structure, whereby the functions of a container or that of a carrying holder could be optionally performed.

2. Description of the Related Arts

Electrical devices are often equipped with covering attachments. According to the functions thereof, a greater part of these attachments could be classified into two types. The first type includes structures for attaching objects to the coverings, and the second type involves structures that add transportation. For example, hi-fi equipments are usually equipped with hitches on the shells for the suspending of megaphones; for PC monitors, the case are often equipped with mouse containers; as well, some heavy apparatuses are equipped on the case with carrying holders for easy transportation.

If more than one function was required, generally an electric product would be disposed with several kinds of covering attachments. Taking PC monitors as examples, sometimes, it is simultaneously a mouse container and a pair of speaker hitches disposed upon a monitor. Moreover, if necessary, there would be a pair of carrying sockets on the shell, too.

According to the construction mentioned above, however, the conformations of the products would be complicated, and the manufacturing costs would be increased.

SUMMARY OF THE INVENTION

The present invention is to provide a combination of the two types of covering attachments.

According to a first aspect of the present invention, there is provided a covering structure, comprising a case having an assembly surface; and a supporting element, which is pivotally connected to the assembly surface. The supporting element could be orientated between a first orientation and a second orientation, and the supporting element further comprises a supporting socket. The supporting socket is provided as a carrying holder as the supporting element is substantially orientated to the first orientation. The supporting socket is provided for containing objects as the supporting element is substantially orientated to the second orientation.

The case is the covering of a computer monitor, and the covering structure of the present invention further comprises a fixing device, provided to fix the supporting element to the first orientation or the second orientation. The fixing device comprises at least one fixing chuck which is setting on the supporting element and at least one fixing socket which is setting on the assembly surface, wherein the fixing socket is corresponding to the fixing chuck. The supporting element further comprises at least one through hole for suspending the objects.

The covering structure of the present invention further comprises a pivot shaft; the supporting element further comprises a shaft hole accepting the pivot shaft. The assembly surface further comprises a connecting socket; and the pivot shaft is pivotally connected to the connecting socket via the shaft hole, whereby the supporting element is pivotally connected to the assembly surface. The pivot shaft further comprises a stopper at one end, whereby the movement of the supporting element along the pivot shaft is constrained within a predetermined range.

The covering structure of the present invention further comprises a resilient element, which is disposed between the stopper and the supporting element, pushing the supporting element against the assembly surface, and the resilient element is a coil spring.

The supporting element further comprises an attaching board, disposed on the supporting element and across the supporting socket. The attaching board comprises at least one attaching through hole, wherein the attaching through hole is provided for suspending objects.

According to a second aspect of the present invention, there is provided a covering structure, which is placed at a load-bearing surface. The covering structure comprises a case, is a supporting element and an attaching board. The attaching board comprises an assembly surface. The supporting element is disposed on the assembly surface, wherein the supporting element further comprises a first aperture, a second aperture, and a chamber exposed by the first and the second apertures. The first aperture is substantially oriented to the load-bearing surface. The attaching board is detachable disposed on the first aperture substantially; and the supporting element is provided to contain objects as the attaching board is disposed on the first aperture. The supporting element is provided as a carrying holder as the attaching board is removed from the first aperture.

The case is the covering of a computer monitor.

The supporting element comprises at least one groove on the periphery of the first aperture; and the attaching board comprises at least one guiding ridge corresponding to the groove, whereby the attaching board is removably disposed on the supporting element along the groove. Moreover, the supporting element further comprises at least one through hole, which is provided for suspending the objects.

The covering structure according to the first and second aspects of the present invention has a supporting element to provide a combination of the two types of covering attachments; the first type includes structures for attaching objects to the coverings, and the second type involves structures that add transportation, as is mentioned above. Further, in the first aspect of the present invention, the supporting element may be selectively pivoted to and fixed in a desired orientation.

As above-mentioned, the covering structure provides a combination of the two types of covering attachments with a single supporting element; therefore, the conformation of the covering structure is not complicated, and the relatively lower manufacturing cost would be achieved.

BRIEF DESCRIPTION OF THE DRAWINGS

The present invention can be fully understood from the following detailed description and preferred embodiment with reference to the accompanying drawings in which.

DETAILED DESCRIPTION OF THE EMBODIMENT

The first embodiment

Figure 1A:
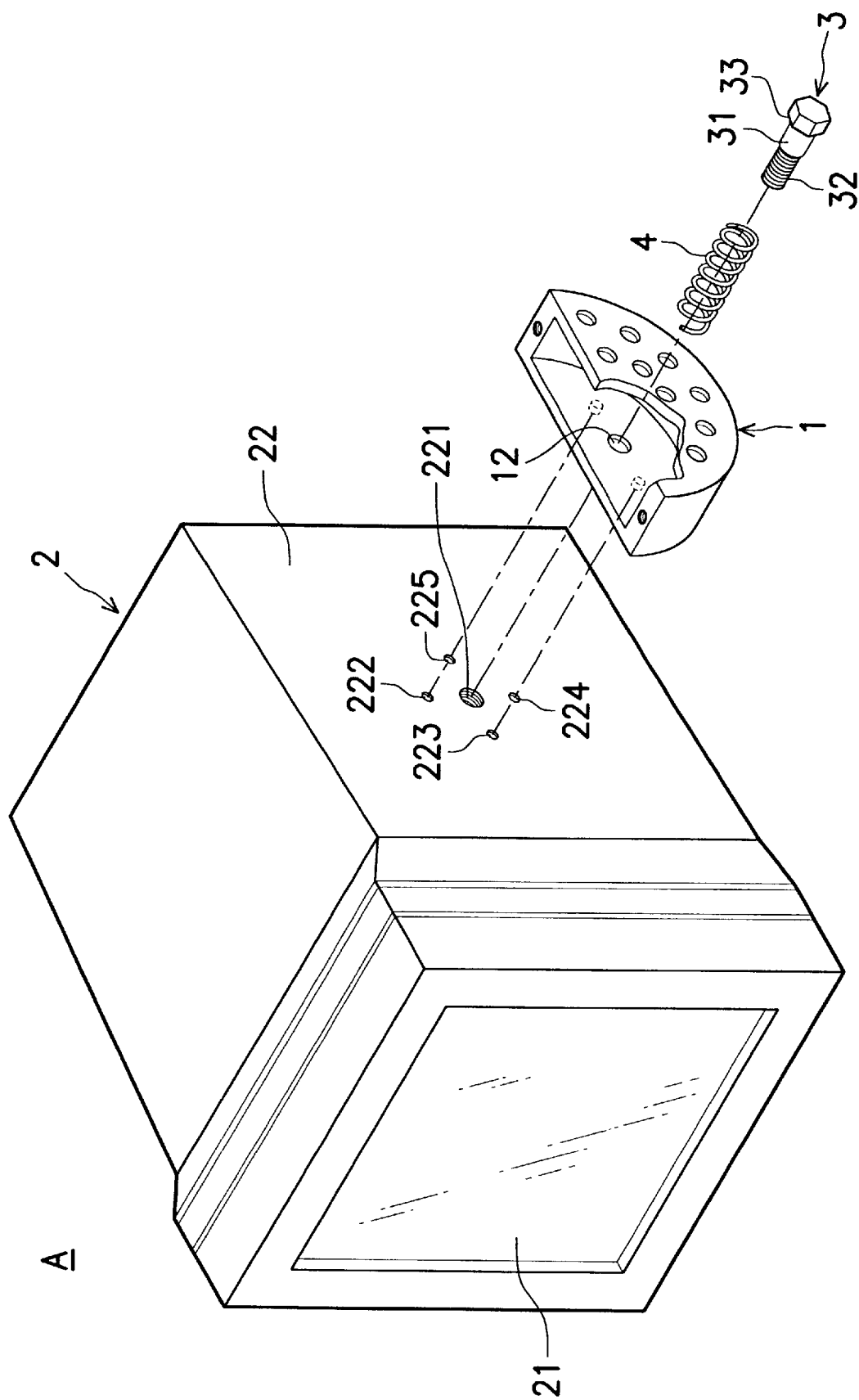
FIG. 1a is an exploded view of a covering structure according to the first embodiment of the present invention.

FIG. 1 shows a perspective view of a covering structure according to the first embodiment of the present invention. The covering structure is the covering of a PC monitor A. Primarily, the covering A comprises a case 2 with a display window 21 and two assembly surfaces 22 respectively disposed on both sides of the display window 21, and two supporting elements 1, which are respectively disposed on the assembly surface 22. The supporting element 1, which comprises a supporting socket 15, is pivotally disposed on the assembly surface. In this way, the supporting element could constitute a dual-functional structure, whereby the constructions of a container or that of a carrying holder could be optionally performed. The construction of the supporting element 1 will be described below.

Figure 2:
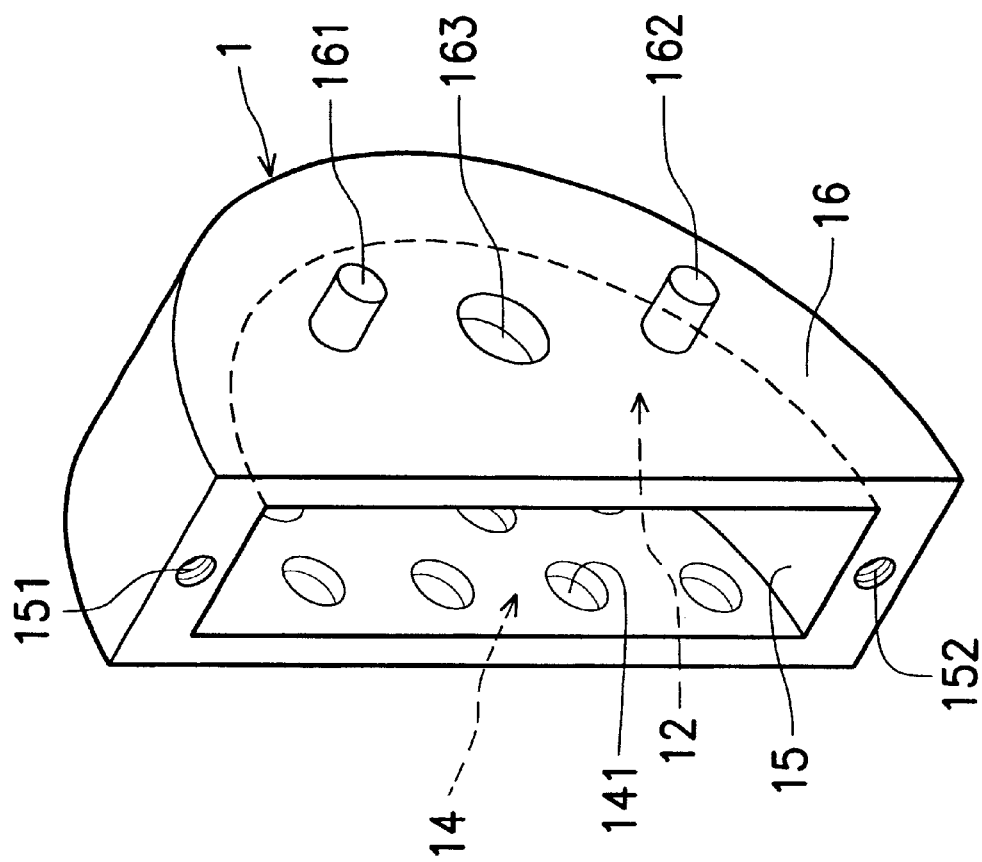
FIG. 2 is a perspective view of a supporting element in a covering structure according to the first embodiment of the present invention.

FIG. 2 shows the supporting element 1 which comprises two cylindrical fixing chucks 161, 162 and a shaft hole 163. The fixing chucks 161, 162 are disposed on a first surface 16. The shaft hole 163 is located at the middle point between the fixing chucks 161 and 162. The Shaft hole 163 is a through hole.

Figure 3:
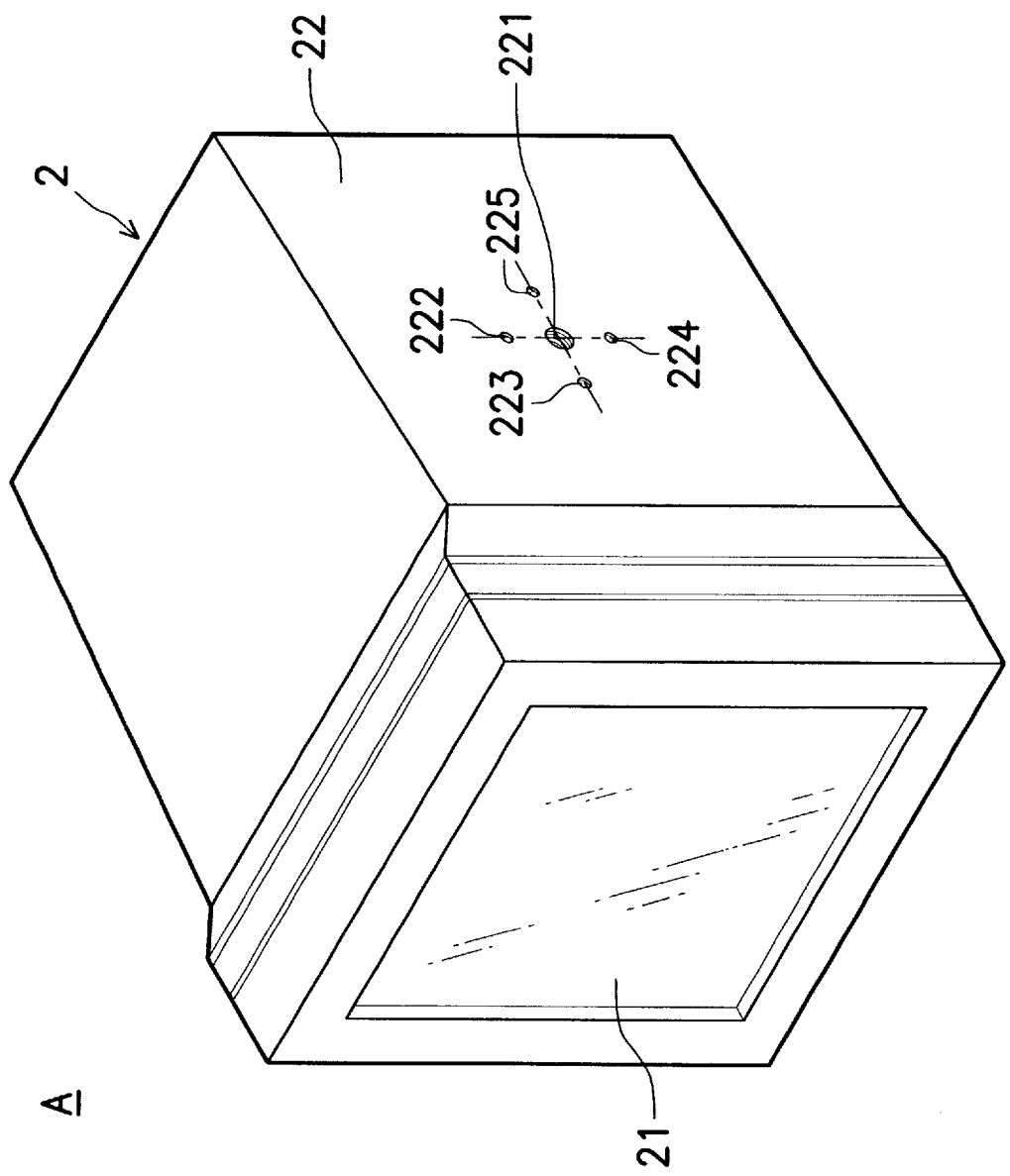
FIG. 3 shows a case of a covering structure according to the first embodiment of the present invention.
Figure 4:
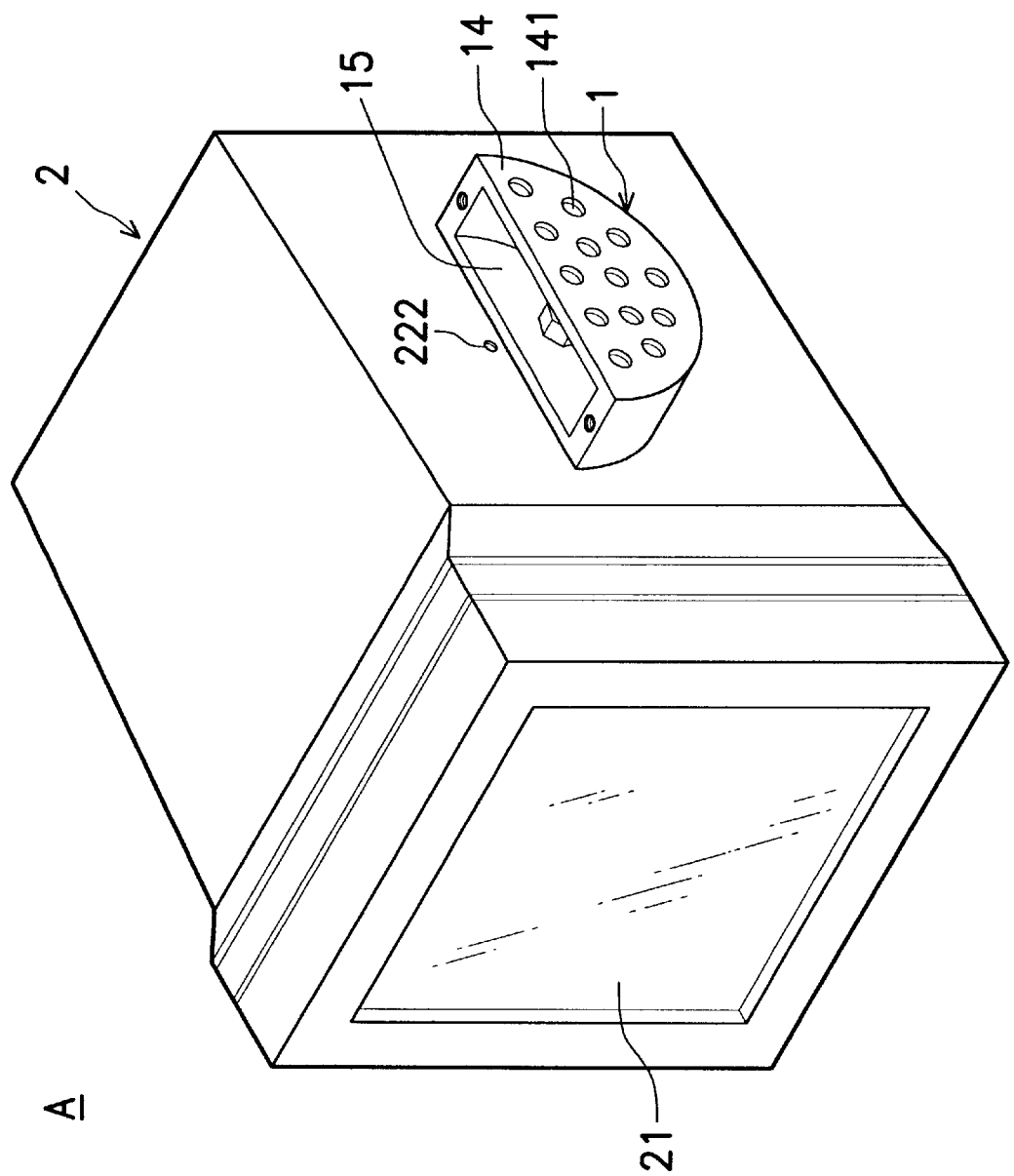
FIGS. 4, 5, 6 show the various orientations adjusted for a supporting element of a covering structure according to the first embodiment of the present invention.
Figure 5:
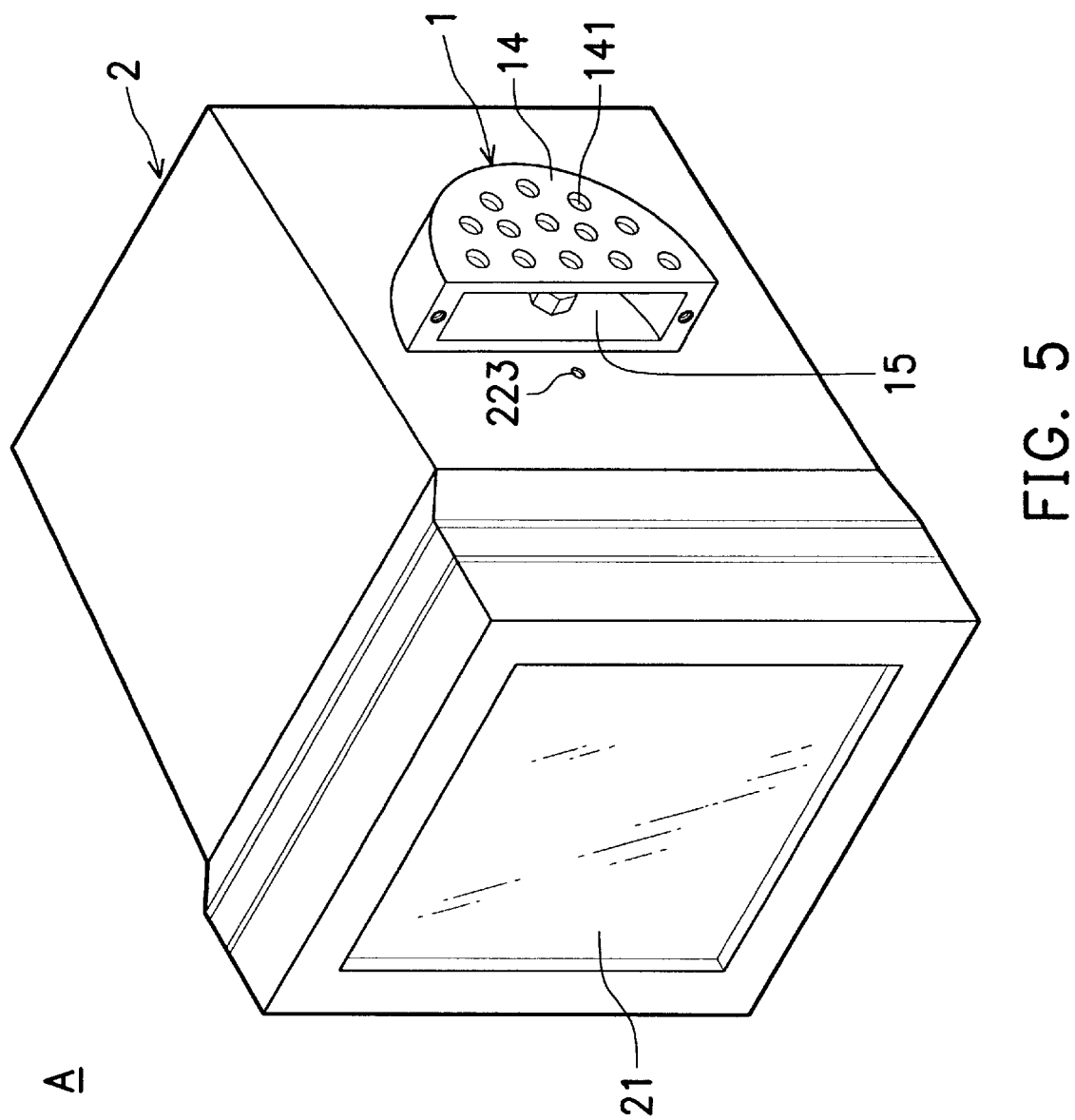
Figure 6:
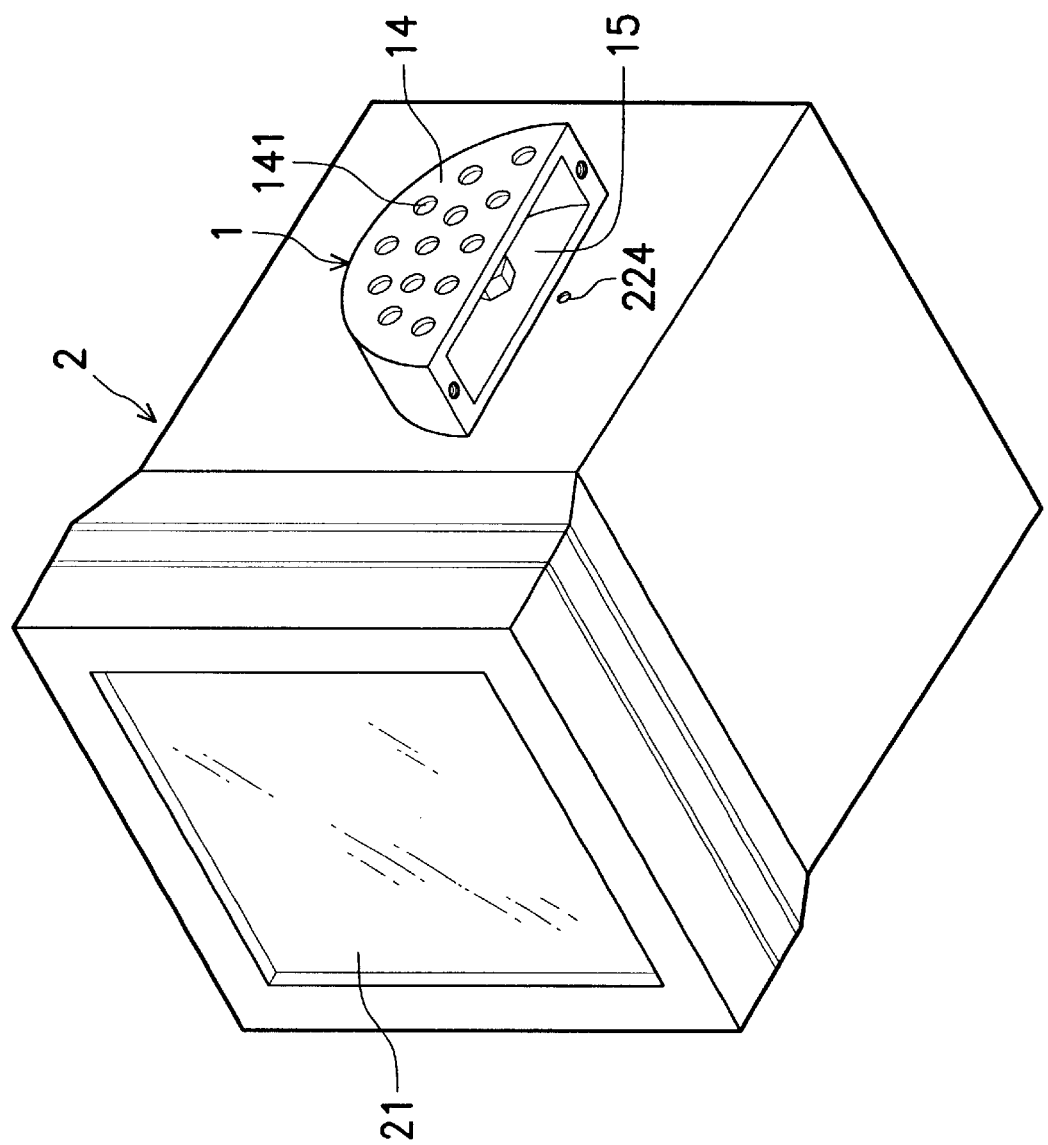

Refer to FIG. 3, the assembly surface 22 on the covering A comprises a connecting socket in accordance with the shaft hole 163. The connecting socket is preferably screwed and turned into a first screw hole 221. Additionally, the assembly surface 22 is further disposed with 4 fixing sockets 222-225, which are disposed in accordance with the positions and shapes of the fixing chucks 161 and 162. By inserting the fixing chucks 161 and 162 into the fixing sockets 222-225 in various manners, as shown in FIG. 4 to 6, the supporting element 1 could be positioned on the assembly surface 22 in various orientations.

Figure 1B:
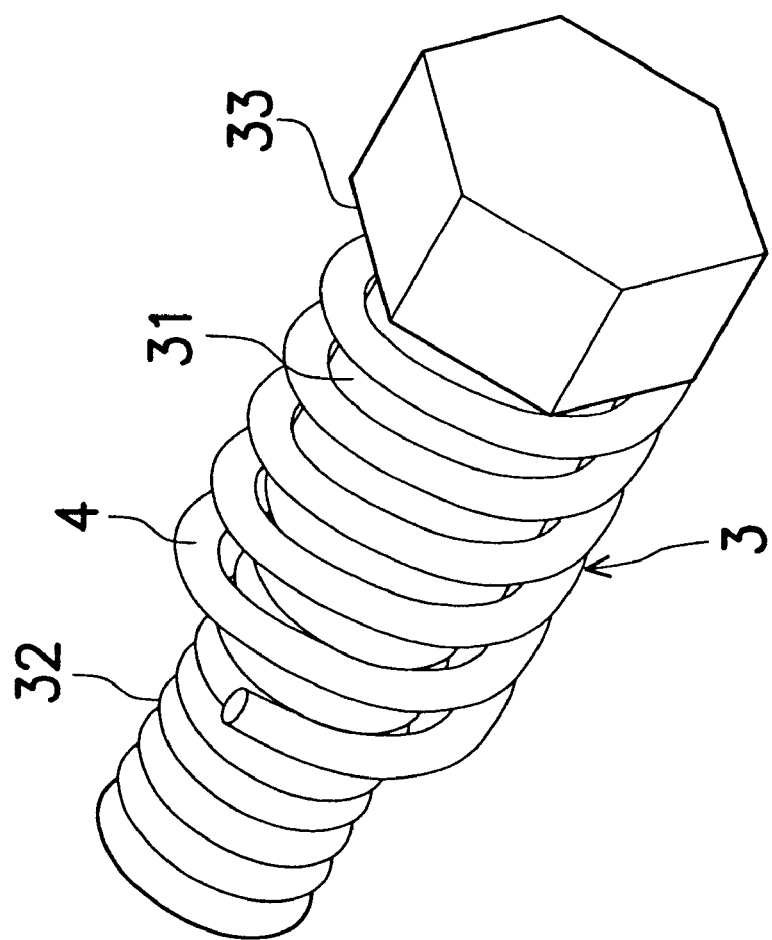
FIG. 1b is an enlarged perspective view of a bolt and a coil spring in a covering structure according to the first embodiment of the present invention.

As shown in FIGS. 1a and 1b, the covering A further comprises a pivot shaft, the pivot shaft is preferably screwed and turned into a bolt 3. The screw threads 32 of the bolt 3 are in accordance with those of the screw hole 221. The bolt 3 is used to pierce through the supporting element 1 from an inner surface 12 of the supporting socket 15 via the shaft hole 163, and then fasten to the assembly surface 22 via the first screw hole 221, whereby the supporting element 1 is pivoted.

The bolt 3 further comprises a stopper 33, which is larger than the shaft hole 163 in radius, whereby the supporting element 1 is constrained. More over, the bolt 3 further comprises a non-threaded portion 31, wherein the radius of the non-threaded portion 31 is substantially the same as that of the shaft hole 163. The supporting element 1 could slide smoothly in a predetermined distance along the non-threaded portion 31 of the bolt 3. By sliding in a predetermined range, the supporting element 1 may rotate about the bolt 3 without being blocked by the interferences between the fixing sockets 222 to 225 and the fixing chucks 161 and 162.

Preferably, there is a resilient element disposing between the stopper 33 of the bolt 3 and the inner surface 12 of the supporting element 1, whereby the supporting element 1 may be pushed against the assembly surface 22 while an insertion is operated between the fixing chucks 161, 162 and the fixing sockets 222-225. In this manner, the fixing stability could be enhanced. The resilient element is preferably a coil spring 4.

If a user wants to adjust the orientation of the supporting element 1, the first procedure is to pull the supporting element 1 away from the assembly surface 22, and make the fixing chucks 161, 162 coming off the fixing sockets conjugated (the coil spring 4 is then compressed by the force imposed). The second, turning the supporting element 1 to the desired orientation, wherein the fixing chucks 161, 162 are adjusted to be conjugated with two of the fixing sockets 222-225, then releasing the supporting element 1 and make it pushed back against the assembly surface 22 by the coil spring 4.

As shown in FIG. 4, preferably, the supporting element 1 further comprises plurality through holes 141 for the suspension of objects (not shown), such as speakers, cameras, decorations, and so on. In the present embodiment, the through holes 141 are essentially disposed on a sidewall 14 of the supporting element 1.

The supporting socket 15 is adapted to containing elements, such as a PC mouse, stationery, books, ornaments, and so on. Conversely, if transport is required, users may adjust the supporting element 1 to the orientation as shown in FIG. 6, wherein the supporting socket 15 is substantially facing the ground. The supporting element 1 in this orientation may be taken as a carrying holder, which facilitates the transportation.

Figure 7:
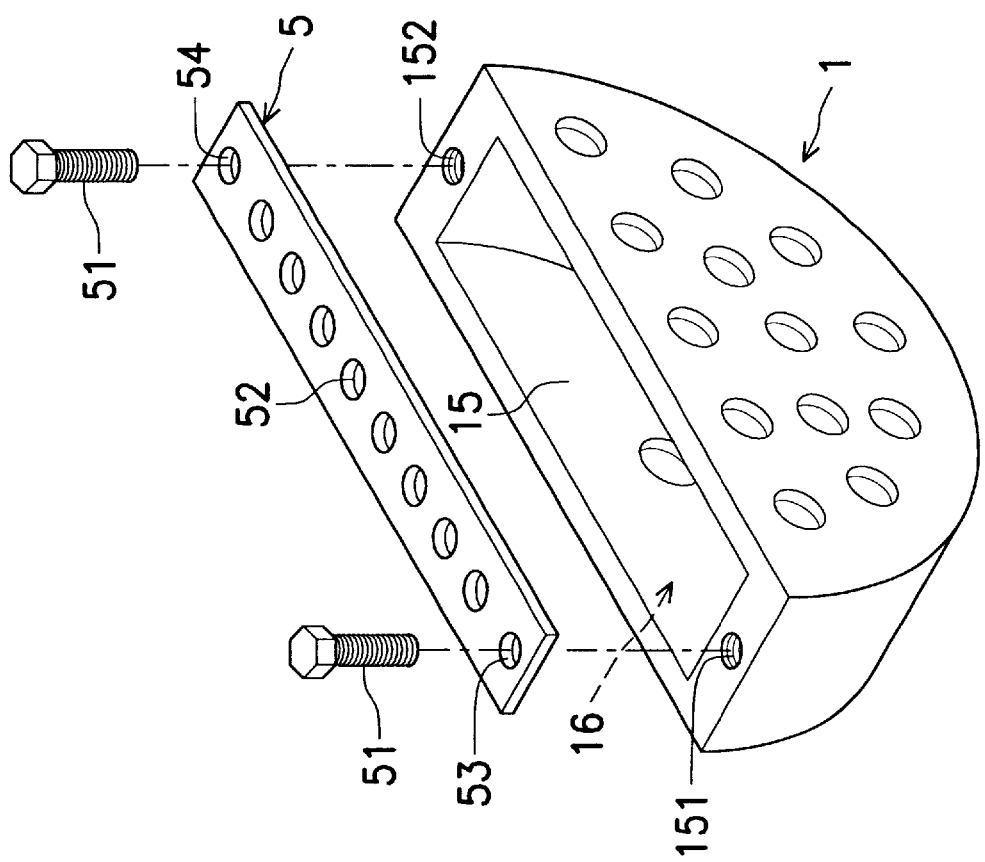
FIG. 7 is an exploded view, which shows the disposition of an attaching board of a covering structure according to the first embodiment of the present invention.

As shown in FIG. 7, preferably, the supporting element 1 of the present embodiment further comprises an attaching board 5, which comprises plurality attaching through holes 52. The attaching board 5 is removably disposed on the supporting element 1 across the supporting socket 15. The attaching board 5 provides more through holes in another aspect, and the supporting element 1 is enabled to suspend more objects. The removal of the attaching board 5 may be executed by the following manner. Preferably, the supporting element 1 comprises two second screw holes 151, 152 on the periphery of the supporting socket 15. Accordingly, it is preferable that the attaching board 5 further comprises two fixing holes 53, 54 in accordance with the second screw holes 151, 152. Moreover, there are two screws 51, which are used for fixing the attaching board 5 to the supporting element 1 via the fixing holes 53, 54 and the second screw holes 151, 152 thereof.

The second embodiment

Figure 8:
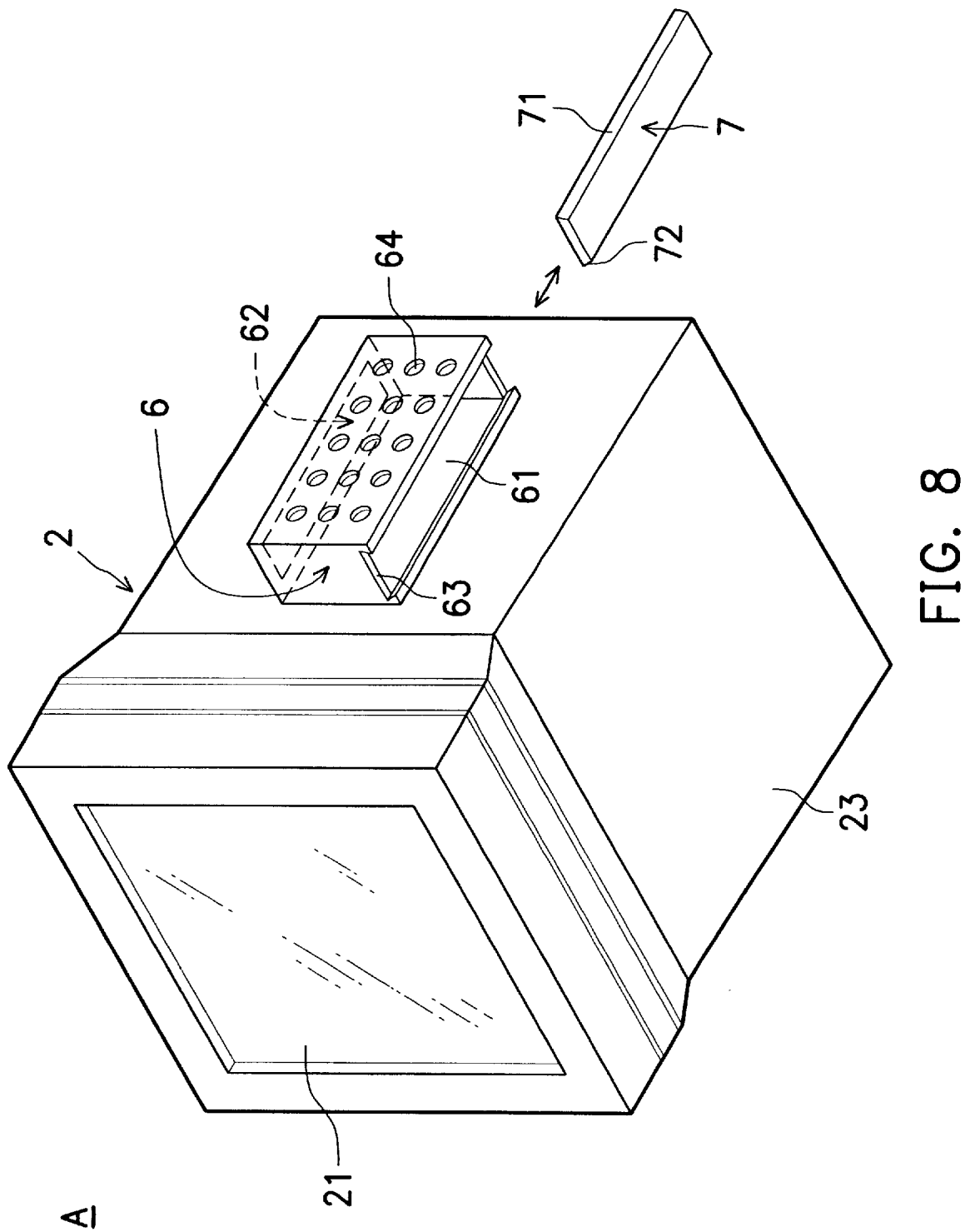
FIG. 8 is a perspective view of a covering structure according to the second embodiment of the present invention.

The second embodiment according to the present invention, which is also the cover of a computer monitor, is shown in FIG. 8. The construction of the covering is similar to that of the first embodiment, excepting: (1) The supporting element 6 is fixed disposed on the assembly surface 22, wherein the supporting element 6 comprises a first aperture 61 and a second aperture 62. The first aperture 61 is substantially oriented to a load-bearing surface 23 (i.e., a table surface). (2) Instead of the attaching board 51 the covering structure according to the second embodiment of the present invention comprises an attaching board 7, removably disposed on the supporting element 6, covering the first aperture 61 substantially. The periphery of the first aperture 61 is disposed with groove 63, and the attaching board 7 is comprised of guide ridges 71, 72, in accordance with the groove 63, whereby the attaching board 7 is adapted to be inserted into the supporting element 6 along the groove. Moreover, the supporting element 6 further comprises at least one through hole 64, which is provided for suspending objects.

The supporting element 6 is provided for containing objects as the attaching board 7 is conjugated with the groove 63 on the supporting element 6. Conversely, as the attaching board 7 is removed from the supporting element 6, the supporting element 6 is suitable to be a carrying holder that mentioned above.

While the invention has been described with reference to a preferred embodiment, the description is not intended to be construed in a limiting sense. It is therefore contemplated that the appended claims will cover any such modifications or embodiments as may fall within the scope of the invention defined by the following claims and their equivalents.

What is claimed is:

1. A covering structure, comprising:
   a case having an assembly surface;
   a supporting element pivotally connected to the assembly surface, the supporting element comprising a supporting socket;
   a first and a second fixing sockets formed on the assembly surface; and
   a fixing chuck formed on the supporting element, the fixing chuck selectively receivable into one of the first and the second fixing sockets for positioning the supporting element in one of a first orientation and a second orientation;
   wherein when the supporting element is in the first orientation, the supporting socket is facing downward as a carrying holder, when the supporting element is pivoted to the second orientation, the supporting socket is facing upward as a container said fixing sockets and fixing chuck preventing the supporting element from pivoting.

2. The covering structure of claim 1, wherein the case is a computer monitor shell.

3. The covering structure of claim 1, wherein the supporting element further comprises at least one through hole formed on a sidewall of the supporting element for suspending objects.

4. A covering structure, comprising:
   a case having an assembly surface;
   a supporting element pivotally connected to the assembly surface, the supporting element comprising a supporting socket and a shaft hole; and
   a pivot shaft protruded from the assembly surface, the pivot shaft piercing the supporting element through the shaft hole for positioning the supporting element in one of a first orientation and a second orientation;
   wherein when the supporting element is in the first orientation, the supporting socket is facing downward as a carrying holder, and when the supporting element is in the second orientation, the supporting socket is facing upward as a container.

5. The covering structure of claim 4, wherein the pivot shaft further comprises a stopper, whereby the movement of the supporting element along the pivot shaft is constrained in a predetermined distance.

6. The covering structure of claim 5, further comprising a resilient element, which is disposed between the stopper and the supporting element, whereby pushing the supporting element against the assembly surface.

7. The covering structure of claim 6, wherein the assembly surface further comprises a connecting socket, and the pivot shaft connects to the assembly surface via the connecting socket.

8. A covering structure, comprising:
   a case having an assembly surface;
   a supporting element pivotally connected to the assembly surface, the supporting element comprising a supporting socket; and
   an attaching board disposed above the supporting socket, the attaching board comprising an attaching through hole;
   wherein when the supporting element is disposed in a first orientation, the supporting socket is facing upward or downward;
   wherein when the supporting element is disposed in a second orientation, the attaching board is substantially vertically extended for suspending an object.

9. A covering structure, which is placed at a load-bearing surface, the covering structure comprises:
   a computer monitor shell having an assembly surface;
   a supporting element, disposed on the assembly surface, and having a first aperture, a second aperture, and a chamber formed between the first and the second apertures, wherein the first aperture is substantially oriented to the load-bearing surface; and
   an attaching board, removably disposed on the supporting element for covering the first aperture substantially;
   wherein the supporting element is provided for containing objects as the attaching board is disposed on the supporting element, and the supporting element is provided as a carrying holder as the attaching board is removed from the supporting element.

10. The covering structure of claim 9, wherein the supporting element comprises at least one groove on the periphery of the first aperture; and
    the attaching board comprises at least one guiding ridge corresponding to the groove, whereby the attaching board is removably inserted into the supporting element along the groove.

11. The covering structure of claim 10, wherein the supporting element further comprises at least one through hole, which is provided for suspending objects.

* * * * *